Oct. 11, 1966  D. SILVERMAN  3,277,977
SEISMIC SURVEYING WITH MULTIPLE FALLING WEIGHTS
Filed Oct. 28, 1963  6 Sheets-Sheet 1

DANIEL SILVERMAN
INVENTOR.

BY Newell Potter

ATTORNEY.

Oct. 11, 1966  D. SILVERMAN  3,277,977
SEISMIC SURVEYING WITH MULTIPLE FALLING WEIGHTS
Filed Oct. 28, 1963  6 Sheets-Sheet 2
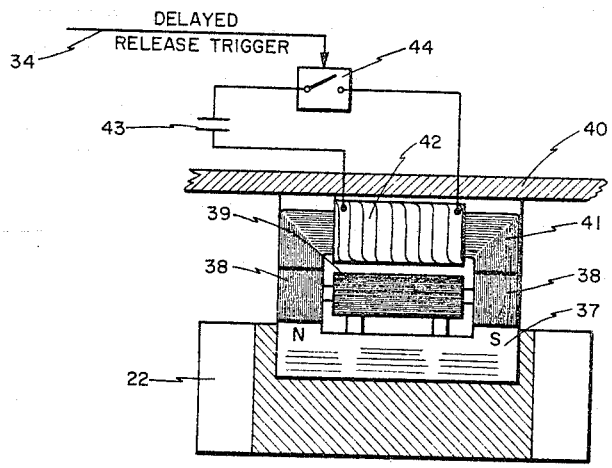
Fig. 3
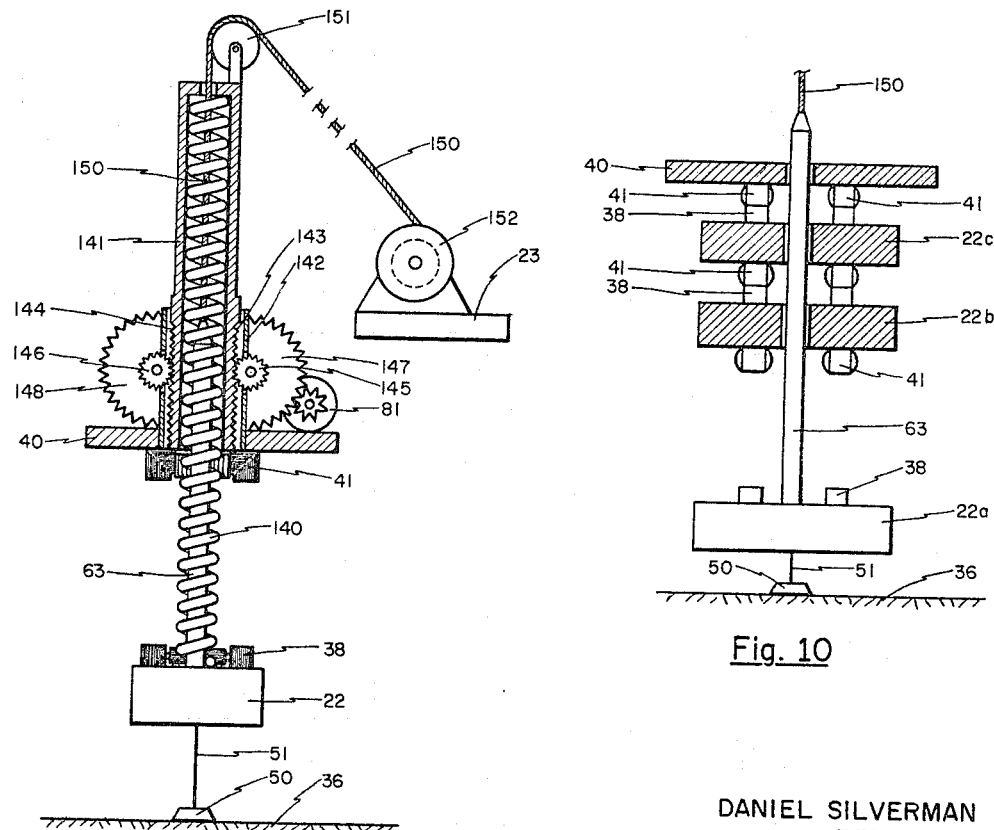
Fig. 9
Fig. 10
DANIEL SILVERMAN
INVENTOR.
BY *Newell Poltoff*
ATTORNEY.

DANIEL SILVERMAN
INVENTOR.

BY Newell Porter

ATTORNEY.

Oct. 11, 1966  D. SILVERMAN  3,277,977
SEISMIC SURVEYING WITH MULTIPLE FALLING WEIGHTS
Filed Oct. 28, 1963  6 Sheets-Sheet 5

DANIEL SILVERMAN
INVENTOR.

BY Newell Potter

ATTORNEY.

Oct. 11, 1966 D. SILVERMAN 3,277,977
SEISMIC SURVEYING WITH MULTIPLE FALLING WEIGHTS
Filed Oct. 28, 1963 6 Sheets-Sheet 6

DANIEL SILVERMAN
INVENTOR.

BY *Newell Pottoff*

ATTORNEY.

United States Patent Office 3,277,977
Patented Oct. 11, 1966

3,277,977
SEISMIC SURVEYING WITH MULTIPLE FALLING WEIGHTS
Daniel Silverman, Tulsa, Okla., assignor to Pan American Petroleum Corporation, Tulsa, Okla., a corporation of Delaware
Filed Oct. 28, 1963, Ser. No. 319,307
13 Claims. (Cl. 181—.5)

This invention relates to seismic geophysical surveying and is directed particularly to the utilization of devices making an impact against the ground surface as the source of seismic-wave energy. More particularly, the invention is directed to improvements in seismic surveying utilizing falling weights so that a plurality of such weights can be used simultaneously or in a predetermined time pattern to increase the energy input into the ground and otherwise enhance the seismic signal-to-noise ratio.

As alternatives to explosives detonated so as to create near the earth's surface seismic waves which travel by various paths to remote detection points and thereby reveal information concerning the various paths followed, the use of falling weights and other devices making an impact against the ground surface and the use of servo-controlled, hydraulically-powered vibrators have gained acceptance. Although both the energy input and the power are low in the case of impact devices and vibrators as compared with explosives, these limitations in the case of impactors are largely overcome by combining a great number of successive recordings of individual impacts into a summation signal. In the case of vibrators, which are at present subject to much closer control than falling weights, the limitations are in some degree overcome by using simultaneously a plurality of vibrators controlled from the same source, continuing the vibration over an appreciable length of time, and cross correlating the complex received signals with some counterpart of the input vibrations to establish travel times for interpretation.

As was pointed out in my U.S. Patent 2,779,428, and as has been borne out in field practice using vibrators as sources, the use of a unique time pattern of impulses, coupled with cross correlation of the received waves against against the time pattern, is a powerful analytical technique. Vibrators, including their driving and transporting units, however, are quite expensive as compared with weight-dropping equipment. Weight-dropping equipment heretofore has not been adaptable to producing time patterns of pulses, for the reason that it has generally not been possible to drop a plurality of weights with consistent synchronism or spacing in time. When weights are dropped and the resulting signals are recorded one at a time, the consistency of timing between successive drops is of minor importance, as time variations are allowed for before the resulting signals are summed.

In view of the foregoing it is a primary object of my invention to provide a novel and improved method and apparatus for utilizing a plurality of weight drops in synchronism or time sequence with a high degree of accuracy. A further object is to provide a weight-dropping process and apparatus as the source of seismic waves consisting of a time pattern of impulses, such that the resulting records can be interpreted by cross correlation. A still further object of the invention is to provide a novel method and apparatus for weight-drop seismic-wave generation capable of repeatedly producing a unique time series of impacts with a substantial degree of frequency or time-pattern control. Other and further objects, uses, and advantages of the invention will become apparent as the description proceeds.

Briefly stated, the foregoing and other objects are accomplished by use of a plurality of weights, generally mounted on a corresponding plurality of vehicles for lifting and transporting them, though it is contemplated that more than one weight may be transported by each vehicle. Each weight can be dropped upon electrical or radio signal from a recording point by a release mechanism especially designed to operate in a consistent manner with constant or negligible time delay. Each weight-handling means also includes means for monitoring the height of the weight above the ground surface and adjusting it to a constant value, preferably to within a small fraction of an inch.

To reduce even further the variability which has hitherto interfered with the consistency of simultaneous or successive weight drops, any one or more of several additional expedients may be used. An additional accelerating force may be applied to the mass, in addition to the force of gravity, with several important improvements: the time interval of fall is reduced and controlled, the time of compacting of the surface soil during impact and thus the interval of transfer of the energy of the falling weight to the earth beneath is reduced, and the energy input to the ground is increased. In addition, the surface against which the impact occurs may be modified.

One preferable way to modifying the soil surface, so as to reduce its compliance and therefore allow the transmission of higher-frequency seismic-wave components, is to interpose between the soil and the falling mass a striking plate which is pressed against the earth's surface with all available static pressure. This plate is preferably also equipped with projections that extend downwardly into and through the surface soil layers, which projections have inclined faces that do two things: by a wedging action the surface soil particles are compressed more firmly together than they could be by the force of the weight impact alone, and the projections extend through the surface soil layers so compacted and in some degree contact the more consolidated soil layers underlying the loose surface layer.

Since the action of this striking plate, in compacting the surface soil and reaching through the surface layers to the more compact soil beneath, depends on both the static pressure or force applied thereto and the impact of the weight thereon, the field procedure involved in utilizing this mechanism, preferably with a plurality of weights and weight-dropping vehicles, involves first placing or planting the striking plate and by one or more preliminary impacts with the falling weight bringing it into the intimate contact with the soil surface. Thereafter, as the various weights are dropped simultaneously or in a time pattern as determined by delays or by the signal transmissions from the recording point, the efficiency of transmission of the impacts through the earth's surface soil is considerably improved.

Further, by accurately controlling the effect of the additional driving means accelerating the weight in its downward progress, the variations of the impact times within a predetermined desired time pattern can be held within desired tolerance limits.

This will be better understood by reference to the accompanying drawings forming a part of this application illustrating the principles upon which the invention is based and showing typical embodiments and modifications. In these drawings, FIGURE 1 shows in plan view a typical arrangement of multiple weight-dropping seismic sources and seismic receivers for prospecting;

FIGURE 3 is a detailed view, partially in cross section, of a preferred form of holding and release mechanism;

FIGURE 9 is a view partially in cross section of an alternative form of mass-accelerating apparatus;

FIGURE 10 is a view partially in cross section of a multiple weight-dropping system;

Figure 1:
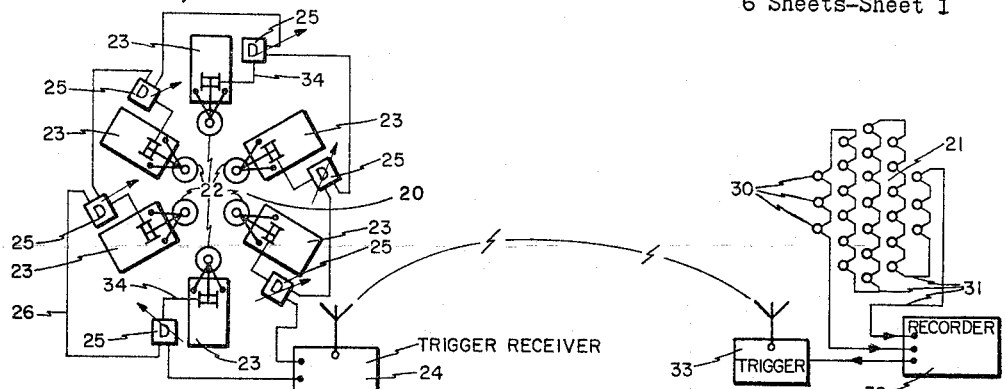

Referring now to the drawings in detail and particularly to FIGURE 1, this figure shows a typical surveying operation utilizing the present invention. Thus, the operation involves generating seismic waves at a source area 20 and receiving the waves at a remote receiving area 21 in a manner entirely conventional in the seismic weight-dropping process. In accordance with the present invention, the setup at the source area 20 may include a plurality of weights 22 respectively transported by a plurality of vehicles 23 or the like, which in some instances may be electrically connected together into a drop-control circuit coupled to a trigger receiver 24 carried by one of the vehicles, each vehicle being preferably provided with a calibrated adjustable delay element 25 receiving, from receiver 24 over connecting wires 26, a signal to actuate, through the delay 25 and lead 34 the mechanism to drop the corresponding weight 22. Of course, it is possible to have a trigger receiver 24 on each vehicle and avoid the use of the interconnecting wires 26.

At the receiving and recording area 21 is typically set out at the ground surface a group of seismometers 30 connected together and to a recorder 32 of conventional form by conductors 31. Recorder 32 may also supply to a trigger-transmitting unit 33 a weight-release signal for transmission to the receiver 24 at the generating location 20.

In operation, the calibrated delay 25 of each vehicle 23 is preset to actuate the weight-release mechanism of the particular weight 22 at a predetermined exact time interval after receipt of a triggering impulse from recorder 32 via trigger transmitter 33 and receiver 24. By apparatus yet to be described, the fall of each of the various weights 22 is very precisely controlled so that impact occurs according to the time pattern established by the delay elements 25. This means that by setting all of delays 25 alike, all of weights 22 may be caused to strike the earth simultaneously; or by setting delays 25 to slightly different values, the impacts will occur within a small time interval, typically less than a half-period of desired seismic waves, such as to amount to essentially a single impulse as received at the receiving point; or by larger differences in settings of delays 25, the impacts have such greater separations of time, either on an irregular or a regular basis, as to form any desired time pattern of separate impulses, which is of longer duration than the seismic wave half-period, but still less than a normal seismic recording period of five or ten seconds, for example.

While it is thus feasible to increase energy input into the ground by simultaneous or closely time-spaced impulses by the weights 22, the preferred method of utilization of the invention is to generate an arbitary or unique series of time-spaced impulses especially adapted for analysis of the resulting records by cross correlation. As is known, such a record interpretive process is capable of strongly discriminating against unwanted events; but prior to the present invention it has been impractical for the weight-dropping process due to lack of a sufficiently precise cntrol of the impacts in a predetermined time pattern which the present invention affords and without which repeatable time patterns of impulses are impractical.

Figure 2:
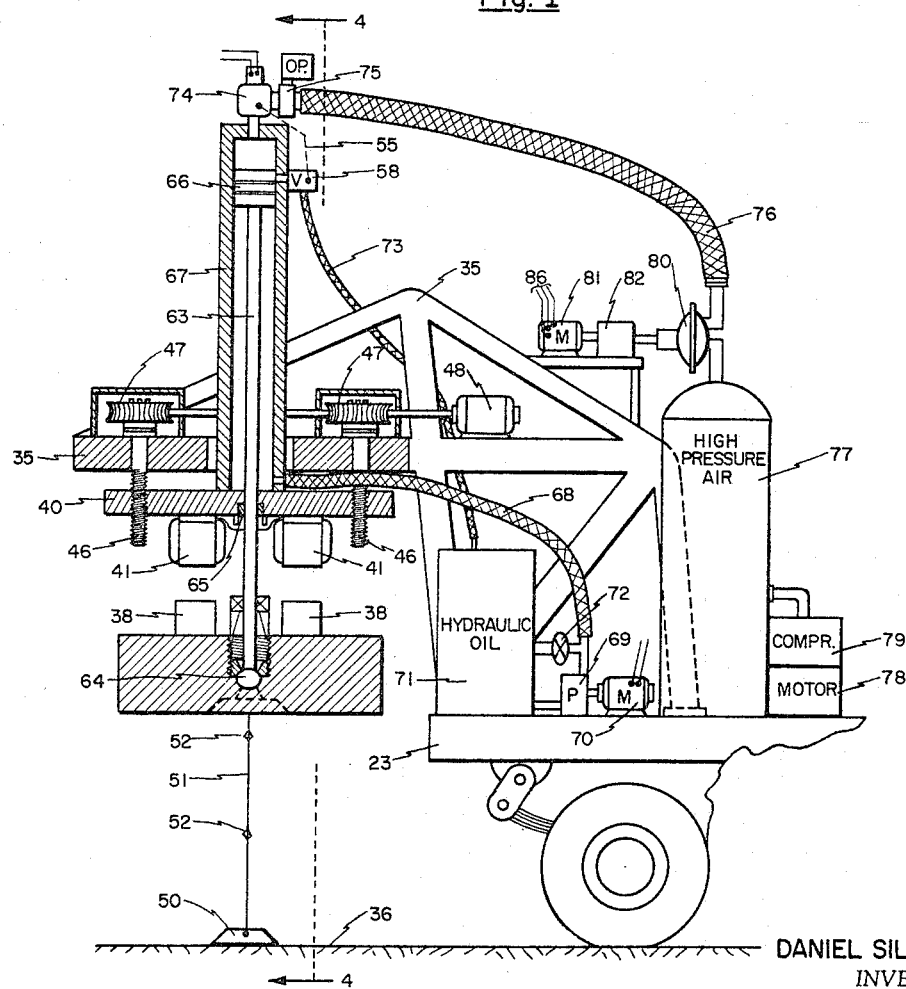
FIGURE 2 shows partially in cross section a preferred form of truck-mounted weight-dropping mechanism embodying the invention.
Figure 4:
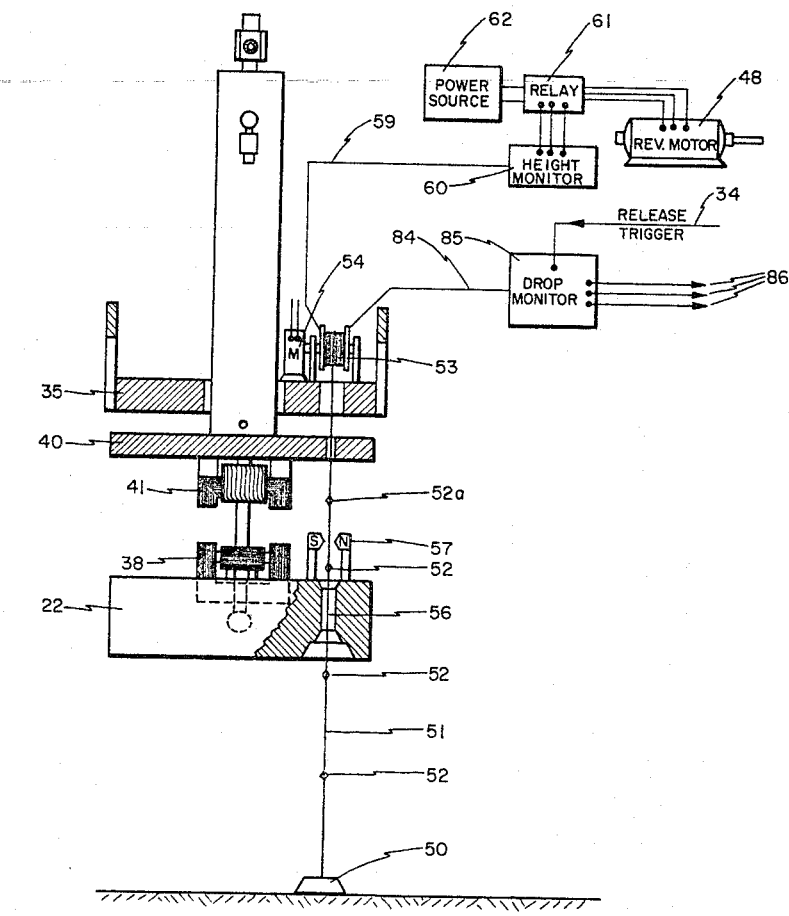
FIGURE 4 is a view partially in cross section of the apparatus of FIGURE 2 along the lines 4—4.

Referring now to FIGURES 2, 3, and 4, in these figures is shown diagrammatically and partially in cross section, a preferred embodiment of a weight-dropping device, with precision controls of the weight-drop process according to the invention. Thus, adapted for transport by the vehicle 23 is a supporting frame 35 from which is dropped the weight 22 by mechanism shown in detail in these figures. At least two factors are of substantial importance in the precise utilization of the falling weight as a source of seismic waves. The distance through which the weight falls must remain essentially constant from time to time, and the initiation of the fall by release of the weight from the supporting mechanism must be done with consistent timing. Furthermore, it may be desired to increase the terminal velocity with which the weight impacts the ground surface over and above that which it achieves in free fall. Accordingly, the prefererd apparatus includes not only accurate height monitoring and release control means, but also means for applying an additional force, preferably controllable, to increase the velocity of the mass 22 during its period of fall before impact. This further contributes to accurately achieving a predetermined instant of impact with the ground surface 36.

The preferred form of precision release mechanism is shown in further detail in FIGURE 3. Fixed within the body of mass 22 is a strong permanent bar magnet 37 with attached laminated permeable pole pieces 38 extending upwardly from its poles. Between pole pieces 38 and supported by non-magnetic spacers, with substantial air gaps surrounding it, is a laminated permeable bar 39. Fixed to the supporting frame 40, supported from main frame 35 in a manner described below, is a laminated permeable bar 41, with its ends facing downwardly toward pole pieces 38, and having a release winding or coil 42 surrounding its central portion.

When pole pieces 38 and the ends of bar 41 are in contact, the force of attraction from the flux of magnet 37 through them is sufficient to support mass 22. The air gaps surrounding bar 39 prevent diversion of any substantial part of this flux through it.

At the moment when release is desired an impulse of electric current, as from the discharge of a large capacitor 43 charged at high voltage, triggered by the delayed release impulse acting on a switching mechanism 44, flows through release coil 42 in a direction to create flux in bar 41 opposing that of magnet 37. This momentarily decreases the flux passing through the contact faces of pole pieces 38 and the ends of bar 41, forcing this flux to shift to bar 39 despite the reluctance of the air gaps. When this shift occurs, mass 22 is no longer supported from bar 41 and starts to fall, opening gaps between this bar and pole pieces 38 that prevent reestablishing flux through bar 41 until contact is made between them again by raising mass 22, magnet 37, and pole pieces 38 from the ground surface.

By avoiding in this way mechanical latches, which are subject to some variation in their speed of operation, a substantial gain in the precision of release of the weight 22 is attained.

For establishing a precise height of the mass 22 at the instant of release above ground surface 36, two of these release mechanisms operating simultaneously are carried by the vertically movable subframe 40 supported from the main frame structure 35 by screw-threaded rods 46. By worm gearing 47 rotatable by a reversible electric motor 48 or the like, the spacing between subframe 40 and main frame 35 can be varied to achieve a constant height of the mass 22 above the ground surface 36.

One means for monitoring this height and maintaining it constant is shown best by FIGURE 4. A small mass 50 rests on the ground surface 36 against which impact is to be made by large mass 22 and has attached to it a flexible wire cable 51 having spaced electrical marker pulse producing elements 52 and wound on a reel 53 carried by main frame 35. Suitable means such as an electric motor 54 applies torque to the reel 53 to maintain cable 51 taut, but insufficient to raise the weight 50 until additional voltage or current is supplied to the motor 54, as when a move to a new location for dropping the weight 22 is to be made. Preferably, the cable 51 passes through an opening 56 in the main weight 22 and also through a signal-generating mechanism 57 attached to weight 22. It is the function of signal generator 57 to generate an electric pulse in the cable 51 whenever in the course of fall a marker unit 52 is passed by unit 57. For example, each marker unit 52 may include a small wire coil, and the mark generator 57 may include a permanent magnet.

As best appears in FIGURE 4, the uppermost marker unit 52a is connected by a lead 59 to a height-monitor circuit 60 which controls a relay 61 between a power source 62 and the reversible motor 48 to actuate the gears 47 and through the threaded rods 46 raise or lower the subframe 40 and the mass 22 to maintain unit 57 adjacent the uppermost marker unit 52a. Thus, the length of cable 51 between unit 52a and ground surface 36, which length does not change, exactly determines the height of mass 22 before release.

Also shown in FIGURE 2 are the means both for raising the mass to a dropping position, and for applying a controllable additional downward force, variable in a manner to be described, to increase the velocity of impact of the mass 22 against ground 36. Thus, a piston rod 63 secured by a ball joint 64 near the center of mass of the weight 22 extends upwardly through a packing gland 65 in the subframe 40 to a piston 66 movable lengthwise in a pressure cylinder 67 fixed to the subframe 40. The space beneath piston 66 in cylinder 67 is connected by a high pressure hose 68 to a pump 69 actuated by an electric motor 70 to pump hydraulic oil from a storage vessel 71 carried by vehicle 23, when a bypass valve 72 between the outlet of pump 69 and hydraulic oil reservoir 71 is closed. Thus, by operation of motor 70 and pump 69 with valve 72 closed, the piston 66 draws mass 22 upwardly until the latching mechanism previously described, can be engaged. Thereafter, valve 72 is opened and the hydraulic oil beneath piston 66 is allowed to drain by gravity back through line 68 and valve 72 into vessel 71, by virtue of a pressure-equalizing connection 73 extending from reservoir 71 to an opening in the side of cylinder 67 just below the piston 66 in its uppermost position.

Piston 66 is adapted not only for raising the weight 22 to its uppermost position, but also for applying to it a varying accelerating force during its downward motion after release. Connected to the top of cylinder 67 is a quick-opening valve 74 and a second cutoff valve 75 which communicate through a flexible hose 76 with a reservoir of high-pressure air 77 carried by vehicle 23. Air reservoir 77 is supplied with air or the like at a high pressure by a motor 78 operating a compressor 79 as required. Interposed between air reservoir 77 and valves 74, 75 is a motor-operated pressure regulator 80 adapted to be adjusted by a motor 81 acting through a transmitting unit 82. Motor 81 is reversible and controlled by means described below, so that by appropriate rotation of motor 81 the regulator 80 provides at valves 74, 75 any desired value of air pressure from the high-pressure reservoir 77.

By a lead 84, FIGURE 4, each of the electrical pulses produced by a marker unit 52, when unit 57 passes it, is transmitted to a drop monitor circuit 85 from which extend leads 86 to control the operation of motor 81. This portion of the circuit is shown in more detail in FIGURE 5. Connected in parallel to the lead 34 to receive the delayed trigger pulse initiating the weight drop are three delay units 87, 88, and 89, respectively connected to three single-shot multivibrator circuits 90, 91, and 92. The multivibrators are respectively connected to comparison gate circuits 93, 94, and 95, which are also supplied with the marker-generated pulses received over lead 84.

Figure 5:
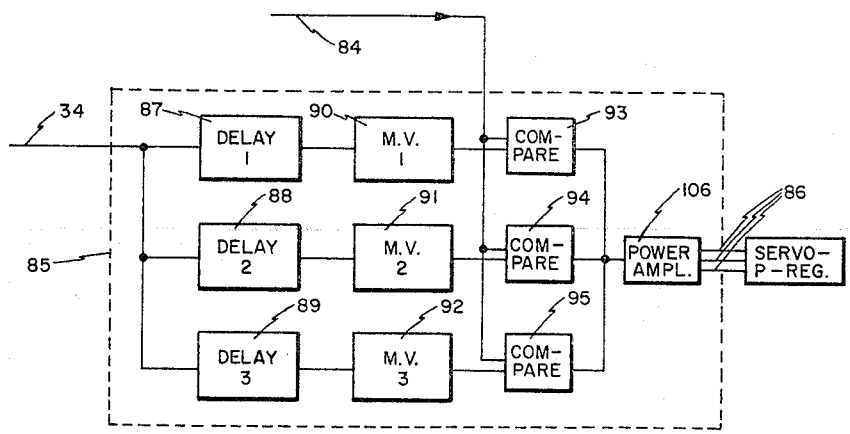
FIGURE 5 is a schematic wiring diagram of part of the apparatus of FIGURE 3.
Figure 6:
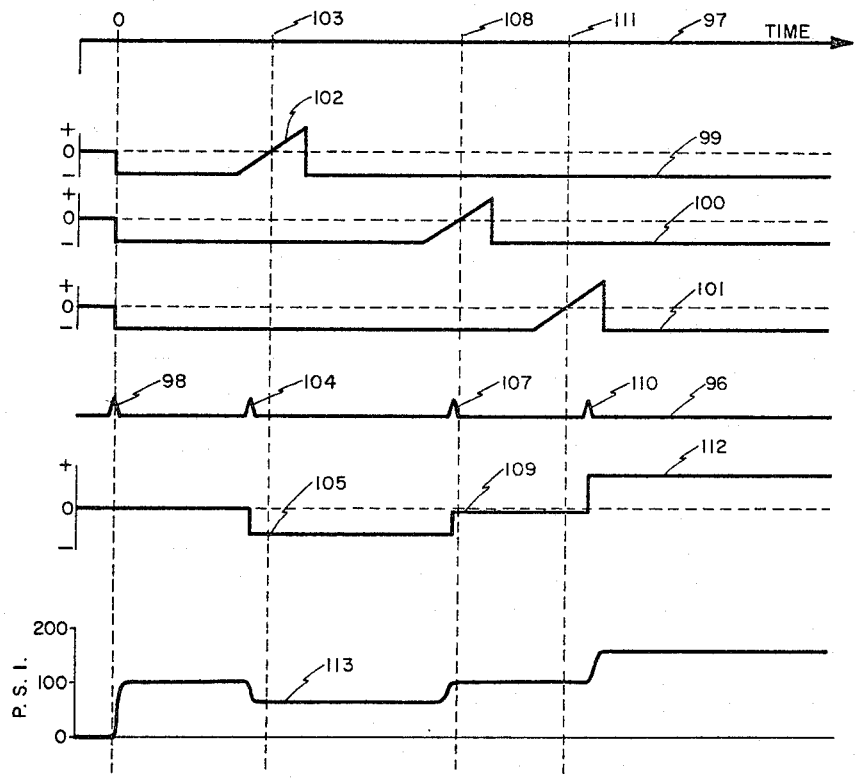
FIGURE 6 shows graphs illustrating a typical operation of the apparatus of FIGURES 4 and 5.

The operation of the circuit of FIGURE 5 may be understood by reference to the graphs of FIGURE 6. The line 96 represents, with reference to the time axis 97, the impulses transmitted over leads 34 and 84 into monitor circuit 85. Impulse 98 represents the release trigger impulse received over lead 34 and establishes zero on the time axis. The traces 99, 100, and 101 respectively are the voltage outputs of multivibrators 90, 91, and 92 as established by the delays of elements of 87, 88, and 89 acting on the impulse 98. Thus, considering delay unit 87 and multivibrator 90 with respect to trace 99, multivibrator 89 is triggered by impulse 98 as delayed by element 87 at such a time as to produce the voltage sweep 102 centered at the time 103 shown on time axis 97. That is, the output of multivibrator 87 passes through zero, in going from negative to positive, at the time of mark 103 after zero time.

The pulse 104 represents the voltage pulse produced when unit 57 passes the uppermost of the three markers 52. If this occurs when the instantaneous voltage value of voltage sweep 102 is zero, namely, in coincidence with time 103, then the output of the comparison gate circuit 93 is zero. The time 103 on axis 97 thus represents the instant when impulse 104 from the uppermost of the lower three markers 52 should occur if weight 22 is falling according to the predetermined time schedule following release impulse 98. The occurrence of impulse 104 before time 103, assumed by way of example, indicates that for some reason the release has occurred slightly sooner than desired, and accordingly 105 represents the voltage output of gate comparator 93 applied to the power amplifier 106, beginning at the time of impulse 104. Similarly, the arrival of impulse 107 from the center unit of the three units 52 very close to the predetermined time 108 reduces the output voltage of gate 94 applied to amplifier 106 to the value 109. In the same way, the arrival of the third impulse 110 from the lowermost of markers 52 at a time later than the proper time 111 reverses the voltage applied to amplifier 106 to a value 112.

The trigger impulse corresponding to time zero is also transmitted to the quick-opening valve 74, and the curve 113 represents a typical variation in the pressure applied to piston 66. Thus, the pressure at or shortly after time zero, when valve 74 opens and by a connection 55 closes a valve 58 in line 73, abruptly increases from zero to some intermediate value such as 100 p.s.i. Subsequently, at the time of pulse 104, due to the fact that this pulse is earlier than desired, indicating a quicker release or higher velocity than desired for the weight 22, amplifier 106 actuates motor 81, and the pressure is reduced sharply to a value substantially less than 100 p.s.i At the time of pulse 107, this reduced pressure is again increased by amplifier 106 actuating motor 81 to a value close to, but slightly below, 100 p.s.i., due to the fact that the down-traveling weight is still somewhat ahead of its predetermined schedule, though by a smaller amount. With the occurrence of pulse 110 indicating that the weight is now behind schedule, the pressure applied to piston 66 rises sharply to a value above 100 p.s.i during the remainder of the drop. By varying the accelerating force of the air pressure action on piston 66 in this way, the velocity of the weight 22 during the time of its travel after release and before impact against the earth's surface 36 is varied to produce the impact at surface 36 substantially at the predetermined time after release impulse 98.

Figure 7:
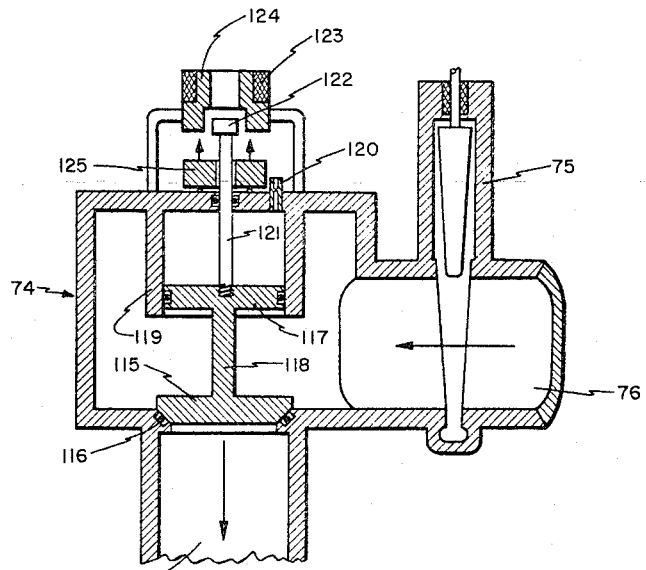
FIGURE 7 is a cross-section of a quick-opening valve mechanism utilized in the invention.

In FIGURE 7 is shown one form of quick-opening valve 74 useful in the present invention. The disc-shaped valve member 115 is held sealed against its seat 116 by the high pressure existing in conduit 76 when valve 75 is open and the pressure in cylinder 67 is substantially atmospheric. The force of the pressure holding valve 115 against its seat is very nearly, but not quite, balanced by the force against a balancing piston 117 connected by rod 118 to valve member 115, the piston 117 forming a seal with and being slidable in a cylinder 119 open to the atmosphere through a restricting orifice 120. An operating stem 121 extends along the axis of cylinder 119 from piston 117 through the wall of the valve culminating in an enlarged head 122. Mounted on the outside of valve chamber 71 concentric with rod 121 is a coil 123 on a fixed armature 124, while a movable ring-shaped armature 125 loosely encircles the rod 121.

In operation, the release trigger impulse 98 is applied to the coil 123 causing the armature 125 to move upwardly toward fixed armature 124 and strike the head 122. This impact momentarily dislodges valve member 115 from its seat 116, whereupon the large force of the high pressure air inside valve chamber 74 acting on piston 115 very rapidly pulls valve member 115 farther away from seat 116. This action is almost instantaneous, except as the air in cylinder 119 and the orifice 120 act as a dashpot or damping mechanism. For resetting the valve 74, the gate valve 75 is closed to lower the pressure inside the chamber of valve 74, to atmospheric, so that valve member 115 may be returned essentially by gravity to its seat 116. Thereafter, reopening valve 75 applies the pressure, determined by the regulator 80, to the interior of valve 74 in readiness for a new operating cycle.

Figure 8:
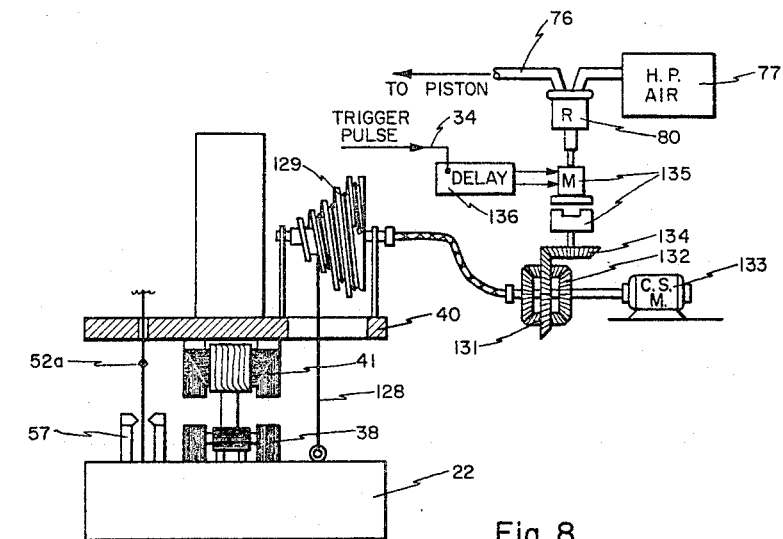
FIGURE 8 is a diagrammatic view of an alternative form of weight-drop control system.

In FIGURE 8 is shown an alternative embodiment of a means of controlling the application of variable air pressure to the piston 66 to vary the velocity of mass 22 during its fall to achieve the desired results. Attached to the mass 22 is a flexible cable 128 extending upwardly to a pulley structure 129 having a spiral groove of a number of turns, along which spiral the diameter of the pulley increases uniformly with distance. The rotation of spiral pulley 129, mounted on sub-member 40, is transmitted by a flexible cable to one side of a differential gear mechanism 131, the other side 132 of the differential being rotated in the opposite direction at constant speed by a constant-speed motor 133. Any difference in speed of rotation of the two sides of differential 131 results in rotation of a gear 134 connected through a magnetic clutch mechanism 135 to the pressure regulator 80 between air reservoir 77 and hose 76 going to cylinder 67. Magnetic clutch 135 is connected through a delay element 136 to receive the trigger pulse on lead 34 which causes actuation of the valve 74 and release of the weight member by coil 42.

The operation of this embodiment is as follows: A short time after the release of mass 22, during which pulley 129 starts to rotate and pay out the lead 128 attached to weight 22, the delay 136 causes closing of the magnetic clutch 135. If at this instant the speed of rotation of spiral pulley 129 exacty matches that of motor 133, no rotation or change is transmitted by the magnetic clutch 135 to regulator 80. However, if pulley 129 is rotating slower than motor 133, the resultant rotation of gear 134 is transmitted through clutch 135 to open regulator 80 and increase the pressure. The opposite rotation reduces the pressure if the speed of rotation of pulley 129 is, or at any time during the fall becomes, greater than the speed of rotation of motor 133.

The shape of the spiral of pulley 129 is exactly chosen so that the linear increase of velocity of the mass 22 as it falls by gravity and is propelled downwardly by the additional force of piston 66, is exactly offset by the increase in radius of the spiral pulley 129 with distance along the periphery of the pulley so that the speed of rotation of pulley 129 remains constant. Thus, variations in speed of rotation of this pulley due to mass 22 not having the proper velocity at any given instant following the trigger pulse 98, result in automatically applying through the piston 66 and cylinder 67 a greater or less amount of additional force. Besides producing the impact against earth surface 36 substantially exactly at the desired time interval after trigger pulse 98, the additional energy imparted to the mass 22, and thence to the ground surface upon impact, by the action of the pressure in cylinder 67, constitutes an important gain in energy available for creating seismic waves.

The use of compressed air and a pneumatic piston is only one way of applying a controllable additional force to the mass 22 to regulate its fall and increase the energy available for generating seismic waves. FIGURE 9 shows an alternative embodiment in which the expansive force of a long compressed helical spring 140 aids gravity in accelerating mass 22 toward ground surface 36. The rod 63 here acts as an internal guide for spring 140, its upper end being guided and held by a cylindrical housing 141 vertically movable in a guide 142 fixed to subframe 40. Rack gearing 143 and 144 on housing 141 engaged by pinions 145 and 146, geared together and driven by gears 147 and 148, which are actuated by the reversible motor 81, raises or lowers the upper end of spring 141 to vary its force as required.

While some spring-force variations can be performed during the fall of mass 22, the primary adjustment is ordinarily done before the mass 22 is released, on the basis of the timing of previous drops, as to whether impact was earlier or later than desired. Hydraulic lifting of mass 22 as in FIGURE 2 is here replaced by mechanical lifting by a steel cable 150 passing over a sheave 151 on top of housing 141 to a winch 152 on vehicle 23.

As was indicated above, more than one mass per vehicle can be transported and dropped, according to my invention. Three, by way of example, are shown in FIGURE 10, suspended from frame 40 and coupled together by holding and release mechanisms of the type shown in FIGURE 3. The lowermost mass 22a is attached to the rod or tube 63 which acts as a guide for the masses 22b and 22c when they are subsequently released. Lifting of the masses back to the monitored height above ground surface 36 is done, as in FIGURE 9, by a cable 150 and winch mechanism.

Figure 11:
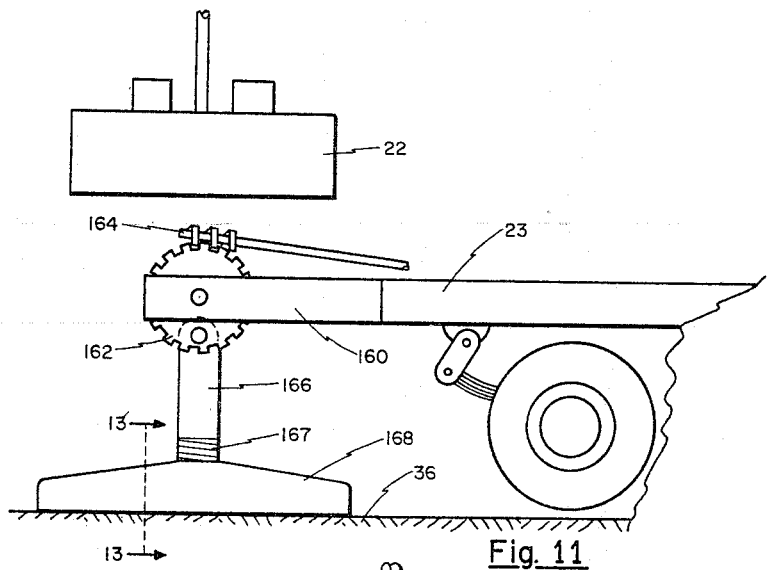
FIGURES 11 and 12 are elevation views of a ground-coupling mechanism usable with the invention.
Figure 12:
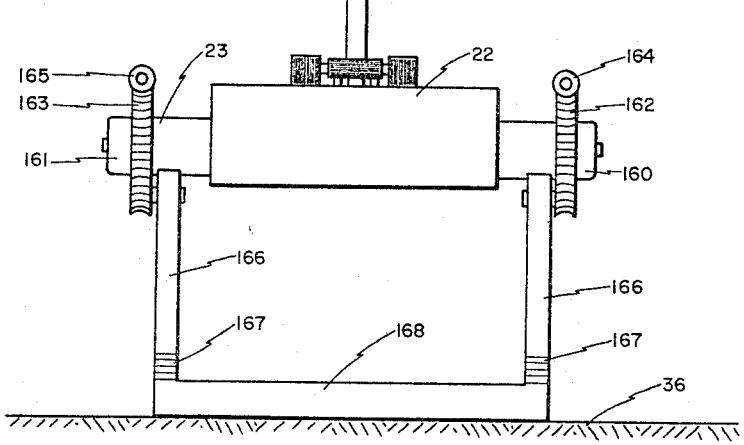

In FIGURES 11 and 12 is shown further means, in the form of a special coupling device, which reduces the variability of the conditions of impact between the mass 22 and the ground surface 36. Extending backward from the frame of vehicle 23 are extension members 160 and 161, respectively carrying axles on which are mounted large-diameter gears 162 and 163. These gears are preferably rotatable from the power source of vehicle 23 by worm gearing 164 and 165, in synchronism. From eccentric pins carried by the gears 162, 163 depend connecting links 166, connected at their lower ends through compliances 167 to a horizontal plate member 168 adapted to be placed in contact with ground surface 36, at least over the area of impact by the weight 22 and preferably a somewhat larger area.

The length of links 166 is such that with their connecting pins to gears 162 and 163 in the lowermost position shown in FIGURES 11 and 12, the wheels of vehicle 23 are lifted off ground surface 36, and a substantial part of the vehicle weight is applied to press plate 168 downwardly against the ground surface. This static loading, over the increased area of plate 168, compacts the ground surface and transmits the impact of weight 22 more uniformly thereto with less transient stress per unit area. With gears 162 and 163 rotated one-half revolution from the position shown in the figures, plate 168 is lifted free of the ground ready for movement of vehicle 23 to a new impact point.

Figure 13:
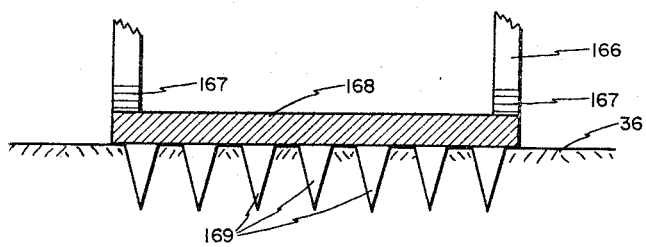
FIGURE 13 is a cross-section view of the device of FIGURE 11 along the line 13—13.

Further details of a preferred form of the coupling plate 168 are shown in FIGURE 13 where the bottom of plate 168 is preferably studded by a large number of inverted pyramidal or cone-shaped projections 169 which serve two purposes: as they are forced downwardly into the soft surface soil layers, the unconsolidated layer becomes strongly compressed between the angular surfaces of the projections 169; and in addition the tips of the projections 169 penetrate to a depth where the surface soil in its native state is relatively more consolidated than the uppermost layer.

By all of the foregoing means, a greater degree of control as well as a more efficient and greater transfer of energy into the ground surface is obtained for transmission as seismic waves to the remote detectors. The high degree of control and repeatability of weight dropping and creating impacts in accordance with this invention make possible the utilization of multiple weights as suggested in FIGURE 1 in a number of ways. For example, all of the weights 22 in FIGURE 1 can be made to impact the ground surface simultaneously, thus increasing the total energy input by a factor equal to the number of weights employed. Alternatively, by different settings of the individual delay units 25, certain of the weights may be made to impact the ground at definite time intervals following the impact of the first weight to strike. These time intervals may be made any desired length. They may be so close together in time as to constitute essentially a single impulse of somewhat greater than normal time duration (i.e. of low frequency, which is more efficiently transmitted) when received at seismometers 30; or they may be so separated in time that some or all of the impacts of the separate weights 22 are individually received without overlapping of the resulting waves of other impacts.

In the latter case, this constitutes an adaptation of the arbitrarily spaced time-impulse method of exploration disclosed in my above-mentioned patent, with the separate weight impulses forming the time pattern with an accuracy such that the time pattern may be repeated any desired number of times.

In using such repetitions of a given time pattern of spaced pulses, it is preferred that the order of impacts be varied among the different weights 22 during generation of successive time patterns. Then, as regards receipt of the resulting energy by reflection from sub-surface interfaces at the reception area 21, the time pattern is essentially nonvariable, whereas the order of receipt of the surface waves generated by the weight impacts varies from one time pattern to the next due to the fact that the different weight impact points are not all equally horizontally spaced from the reception area 21.

It will be understood, however, that the resulting records of time impulse patterns will normally be combined and analyzed in accordance with any of the cross-correlation types of analysis processes known in the art or as taught in my above patent. As such analytical processes are well known in the art, it is not considered necessary to describe and illustrate any of them in detail herein.

While my invention has been described in terms of the foregoing specific details and embodiments, it is to be understood that these are only for purposes of illustration and that the scope of the invention should not be considered as limited to the details set forth. Rather, the scope of the invention is properly to be ascertained from the appended claims.

I claim:

1. Seismic wave generating apparatus comprising a vehicle, a mass, means on said vehicle for elevating and holding said mass at a substantial height above the ground surface, means associated with said elevating and holding means for releasing said mass from said holding means to permit it to fall and strike the earth's surface and generate a seismic impulse, means for measuring the height of a reference point on said mass above the ground surface vertically beneath said mass, and means responsive to said height-measuring means and acting on said elevating and holding means to raise or lower said mass and automatically adjust said height to a predetermined value before said mass is released.

2. Seismic wave generating apparatus comprising a vehicle, a mass carried by said vehicle, means associated with said vehicle for elevating and holding said mass at a substantially constant predetermined height above the ground surface, means associated with said holding means and actuatable upon command from a remote point to release said mass at a given instant of time within a predetermined time interval, means to detect the time when said mass passes each of a plurality of vertically spaced points during its fall toward the ground surface, means for comparing said detected times with the expected times of passing said points, and means responsive to the difference between said detected and expected times to vary the vertical acceleration of said mass so as to reduce said difference substantially toward zero.

3. Seismic wave generating apparatus comprising a vehicle, a mass carried by said vehicle, means associated with said vehicle for elevating and holding said mass at a substantially constant height above the ground surface, means associated with said holding means and actuatable upon command from a remote point to release said mass at a given instant of time to fall toward the earth's surface and create an impact thereon, means actuated by said release command to apply an additional accelerating force to said mass during its fall in addition to the acceleration of gravity, means for continuously measuring the increasing velocity of said mass as it falls, means for comparing said measured velocity with the velocity of fall required to produce impact at a predetermined time after said release command, and means for varying said additional acceleration to reduce the difference between said measured and said required velocity substantially toward zero.

4. Seismic wave generating apparatus as in claim 3 wherein said velocity-measuring and comparing means comprises means for converting the varying velocity of fall of said mass to an approximately constant speed of rotation, means for producing a constant reference speed of rotation, means for producing a rotation representing the difference between said approximately constant and said reference speeds, and wherein said acceleration-varying means utilizes said difference rotation to vary said addition acceleration in the sense to reduce said difference toward zero.

5. Seismic wave generating apparatus comprising a plurality of vehicles, a plurality of masses carried by said vehicles, means on said vehicles for elevating and holding said masses at a substantially constant height above the ground surface, means for releasing said masses from said holding means at precisely determinable instants of time to allow said masses to fall toward and impact the ground surface, means actuatable upon command from a remote point to initiate the action of said releasing means at a predetermined time with respect to said command, and means to vary the velocity of each of said masses as required for all of said masses to impact the earth at predetermined times.

6. Seismic wave generating apparatus as in claim 5 in which said velocity-varying means comprises a cylinder carried by said vehicle, a piston slidable in said cylinder, a rod connecting said mass and said piston, means for supplying air under pressure to drive said piston and said mass downwardly after said release command, and means for varying said air pressure in accordance with the difference between the actual time of passage of said mass past at least one point during its fall as compared to the expected time of passage past said point required to achieve impact of said mass at a predetermined time following said release command.

7. Seismic wave generating apparatus as in claim 1, wherein said holding means comprises means for generating magnetic flux and a magnetic circuit associated with said flux-generating means for conducting said flux through a closed path, said magnetic circuit including at least three flux-conducting elements, one attached to said holding means and another attached to said mass, whereby at least a substantial part of the weight of said mass is supported by the force of attraction of said flux acting between said elements, the third of said flux-conducting elements being separated from the others by a reluctance gap, and wherein said releasing means, upon being actuated by a signal from a seismic-wave recording apparatus, acts to shift a substantial part of said weight-supporting flux momentarily to said separated element to reduce said weight-supporting flux momentarily to a value substantially less than is required to support said mass.

8. Seismic surveying apparatus comprising a plurality of seismic-wave-generating apparatuses as in claim 1, wherein each of said releasing means is adapted upon command from a remote point to allow one of said masses to move downwardly and make an impact with the ground surface, and including also means for transmitting release commands to said releasing means in a time sequence such that the impacts of said masses at said ground surface occur at predetermined times within an interval substantially greater than a predominant seismic half-wave period, and means for receiving and recording the seismic waves resulting from all of said impacts at a location spaced from the area of making said impacts, whereby cross correlation of the output of said recording means with a signal which is a counterpart of said time sequence of impacts by said masses shows the travel times of desired seismic waves.

9. Seismic surveying apparatus as in claim 8 including also means for varying the order in which said masses are released to create said impacts at spaced time intervals.

10. Seismic surveying apparatus as in claim 8 wherein said holding means include adjustable delay means for transmitting release commands received from said recording means to said releasing means to cause release of each of said masses at a different time from the others, whereby all of said masses make impact with the ground surface at different times within a predetermined time interval.

11. Seismic wave generating apparatus as in claim 1 including also means associated with said holding means and actuatable upon command from a remote point to cause said releasing means to release said mass at a given instant of time, and means associated with said vehicle and said mass for driving it downwardly toward the earth's surface at a substantially greater velocity than that due to the acceleration of gravity alone.

12. Seismic wave generating apparatus as in claim 11 wherein said driving means comprises a helical spring and including also means for adjusting the force of said spring.

13. Seismic wave generating apparatus as in claim 1 wherein said mass comprises a plurality of mass units supported one above another by said holding means, and including a separate release means associated with each of said mass units for releasing it independently of the other mass units.

References Cited by the Examiner

UNITED STATES PATENTS

| | | |
|---|---|---|
| 1,753,368 | 4/1930 | DuBois-Reymond et al. 181—0.5 |
| 2,745,507 | 5/1956 | Bodine _____ 181—0.5 |
| 2,851,121 | 9/1958 | McCollum _____ 181—0.5 |
| 2,923,366 | 2/1960 | Meiners et al. _____ 181—0.5 |
| 3,022,851 | 2/1962 | Hasbrook _____ 181—0.5 |
| 3,130,809 | 4/1964 | Flatow _____ 181—0.5 |
| 3,159,233 | 12/1964 | Clynch et al. _____ 181—0.5 |
| 3,209,854 | 10/1965 | Williams _____ 181—0.5 |
| 3,215,223 | 11/1965 | Kirby et al. _____ 181—0.5 |

BENJAMIN A. BORCHELT, *Primary Examiner.*

W. KUJAWA, *Assistant Examiner.*